(12) United States Patent
Kriman et al.

(10) Patent No.: US 10,008,325 B2
(45) Date of Patent: Jun. 26, 2018

(54) THIN MAGNET FABRICATION

(71) Applicant: Apple Inc., Cupertino, CA (US)

(72) Inventors: Moshe Kriman, Tel-Aviv (IL); Adar Magen, Ramat Yishay (IL)

(73) Assignee: Apple Inc., Cupertino, CA (US)

( * ) Notice: Subject to any disclaimer, the term of this patent is extended or adjusted under 35 U.S.C. 154(b) by 335 days.

(21) Appl. No.: 14/733,844

(22) Filed: Jun. 8, 2015

(65) Prior Publication Data

US 2016/0358703 A1 Dec. 8, 2016

(51) Int. Cl.
| H01F 41/02 | (2006.01) |
| H01F 27/38 | (2006.01) |
| H01F 10/00 | (2006.01) |
| H01F 13/00 | (2006.01) |
| H02K 15/03 | (2006.01) |
| H02K 1/27 | (2006.01) |

(52) U.S. Cl.
CPC ....... *H01F 41/0253* (2013.01); *H01F 10/007* (2013.01); *H01F 13/003* (2013.01); *H01F 27/38* (2013.01); *H01F 41/026* (2013.01); *H02K 1/2706* (2013.01); *H02K 1/2786* (2013.01); *H02K 1/2793* (2013.01); *H02K 15/03* (2013.01); *Y10T 29/49075* (2015.01); *Y10T 29/49078* (2015.01); *Y10T 156/1917* (2015.01)

(58) Field of Classification Search
CPC .. H01F 41/0253; H01F 41/026; H01F 10/007; H01F 13/003; H01F 27/38; H02K 1/2706; H02K 1/2786; H02K 1/2793; H02K 15/03; Y10T 29/49075; Y10T 29/49078; Y10T 156/1917
See application file for complete search history.

(56) References Cited

U.S. PATENT DOCUMENTS

| 3,160,860 | A |   | 12/1964 | Henderson |
| 3,710,291 | A | * | 1/1973 | Nicoud ............ Y10T 29/49075 |
|  |  |  |  | 101/389.1 |
| 4,133,911 | A |   | 1/1979 | Koester et al. |
| 4,417,167 | A | * | 11/1983 | Ishii ..................... H02K 1/2786 |
|  |  |  |  | 310/156.26 |

(Continued)

FOREIGN PATENT DOCUMENTS

| JP | 07183119 A | * | 7/1995 |
| KR | 101165303 B1 |   | 7/2012 |

OTHER PUBLICATIONS

PCT Application No. PCT/US2015/056588—International Search Report and Written Opinion dated Mar. 28, 2016.

*Primary Examiner* — A. Dexter Tugbang
(74) *Attorney, Agent, or Firm* — Dickinson Wright RLLP (57) ABSTRACT

Manufacturing techniques for producing thin magnetic elements are designed to accommodate the mechanical properties of sintered magnetic substrates. One of the manufacturing processes involves cutting a magnetizable substrate into a number of slices and adhesively coupling the slices to a sheet that can take the form of a layer of grinding tape. After concurrently grinding a first surface of each of the slices, the slices are flipped over so that the first surface of each slice is attached to another layer of grinding tape. A second surface of each of the slices is then ground until a desired thickness is achieved. Subsequent to the grinding, dicing operations can be applied to the slices to produce magnets having a desired length and width.

16 Claims, 8 Drawing Sheets

(56) References Cited

U.S. PATENT DOCUMENTS

| | | | |
|---|---|---|---|
| 5,804,959 A * | 9/1998 | Nakagawa | H01F 27/38 |
| | | | 323/355 |
| 6,303,471 B1 | 10/2001 | Unno et al. | |
| 6,355,166 B1 * | 3/2002 | Amarasinghe | H01F 10/007 |
| | | | 204/280 |
| 6,903,475 B2 * | 6/2005 | Ortt | H02K 1/2786 |
| | | | 310/154.07 |
| 8,066,897 B2 | 11/2011 | Marley | |
| 8,211,259 B2 * | 7/2012 | Sato | Y10T 156/1917 |
| | | | 156/247 |
| 2004/0001973 A1 | 1/2004 | Gao et al. | |
| 2004/0164730 A1 | 8/2004 | Schroeder et al. | |
| 2012/0075749 A1 | 3/2012 | Wu et al. | |
| 2012/0156441 A1 | 6/2012 | Gerster et al. | |

\* cited by examiner

THIN MAGNET FABRICATION

FIELD

The described embodiments relate generally to methods for accurately forming and magnetizing thin magnetic substrates. In particular, methods for producing thin magnetic substrates while minimizing sample variation are discussed.

BACKGROUND

Modern magnet fabrication processes suffer from substantial sample variation as magnetic substrates of increasingly reduced thicknesses are produced. Often magnets formed by conventional processes begin suffering from substantial sample variation as a thickness of the magnets falls below 1 mm. Magnets of this size can be advantageous in the construction of small form factor electronic components. In some embodiments, a field strength and size of the magnets can be critical to achieving a desired field size. In some embodiments, a magnet having too much dimensional sample variation can prevent the magnet from being successfully packaged within one of the small form factor electronic components. In some embodiments, sample variations of a tenth of a millimeter or less can adversely affect the function and/or fit of one of the magnets.

SUMMARY

This paper describes various embodiments that relate to manufacturing methods for producing magnets having particularly small dimensions.

A manufacturing method is disclosed. The manufacturing method includes at least the following steps: cutting a substrate formed of magnetizable material into slices having an initial thickness greater than a desired thickness; removing portions of the slices until the desired thickness of the slices is achieved; singulating each of the slices into a number of magnetic elements while the slices are coupled with a support structure; and magnetizing the magnetic elements in accordance with a desired magnetic polarity pattern prior to removing the magnetic elements from the support structure.

A method is disclosed. The method includes at least the following steps: cutting a magnetizable substrate into a number of slices; grinding a first side of each of the slices; coupling the first side of each of the slices to an adhesive sheet; concurrently grinding a second side of each of the slices until a desired thickness of each of the slices is achieved, the second side being opposite the first side; dicing each of the slices into a number of magnetic elements having a desired length and width; plating exposed surfaces of each of the magnetic elements with an anti-corrosive layer; magnetizing the magnetic elements; and coupling a magnetically attractable plate to a surface of the adhesive sheet opposite the magnetic elements to keep the magnetic elements fixed in place on the adhesive sheet.

A non-transitory computer readable storage medium is described. The non-transient computer readable medium is configured to store instructions that, when executed by a processor in a computer numerical control (CNC) device, cause the CNC device to carry out a manufacturing method, by carrying out steps that include: cutting a sintered magnetic substrate into a number of slices having substantially similar geometries; adhesively coupling a first surface of each of the slices to a first adhesive sheet; grinding a second surface of each of the slices, the second surface being positioned opposite the first surface, until a desired surface finish is achieved on the second surface; adhesively coupling the second surface of each slice to a second adhesive sheet; separating the first surface of each of the slices from the first adhesive sheet; grinding the first surface of each of the slices until a desired thickness of each of the slices is reached; and dicing each of the slices into a number of magnetic elements.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, where like reference numerals designate like structural elements, and in which.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Sintered magnetic substrates can provide several manufacturing difficulties due to the material properties inherent to sintered magnetic substrates. For example, sintered magnetic substrates made from rare earth metals tend to be quite brittle, resulting in a low mechanical strength. For this reason, conventional manufacturing operations can subject the sintered magnetic substrates to cracking or fracture under stresses induced during the conventional manufacturing operations. Consequently, shaping operations are generally carried out utilizing cutting tools having extremely sharp edges that minimize mechanical stresses experienced by the sintered magnetic substrates. Unfortunately, even when extremely sharp edged cutting tools are utilized, getting consistent dimensional accuracy when shaping a sintered magnetic substrate to have a dimension of less than 500 microns can be quite challenging. Achieving a dimensional thickness of less than 100 microns during a cutting operation is generally considered to be infeasible. Dimensional variations resulting from the aforementioned types of cutting operations, in which a consistent dimensional accuracy cannot be reliably achieved, can have highly detrimental effects on yields of magnets formed from the sintered magnetic substrates. For this reason, alternative ways of forming thin magnet that include one or more dimensions of less than a millimeter are highly desired.

One solution to this problem is to cut the sintered magnetic substrates to a shape or geometry slightly larger than desired in a final magnet and then to apply grinding operations that alter the dimensions of the sintered magnetic substrate to a desired size and shape. In particular, the grinding operations can be particularly effective at reliably achieving magnet thicknesses as small as about 80 microns. As mentioned above, dimensional accuracy can be particularly critical when a desired dimension is particularly small. For example, when shaping a sintered magnetic substrate to have a final dimension of less than a millimeter, dimensional sample variations amounting to greater than 10 microns can begin to have substantial effects on an overall volume of the sintered magnetic material. The greater accuracy inherent with finely tuned grinding operations can provide the accuracy necessary to achieve consistent dimensional accuracies. In some embodiments, total thickness variation of the magnets can be tightly controlled to be within +/−5 microns, whereas traditional approaches yield accuracies that can vary by as much as +/−30 microns. In addition to providing very tight thickness control, the disclosed manufacturing methods also provide excellent parallelism, which results in very consistent thicknesses for magnets of the same batch as well as substantially parallel opposing surfaces of each produced magnet. The substantially parallel surfaces can be very helpful in many kinds of configurations where one or more of the magnets is stacked with other magnets or components.

These and other embodiments are discussed below with reference to FIGS. 1A-4; however, those skilled in the art will readily appreciate that the detailed description given herein with respect to these figures is for explanatory purposes only and should not be construed as limiting.

Figure 1A:
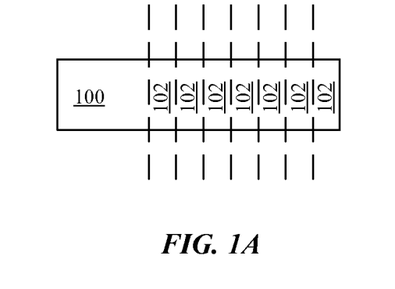
FIG. 1A shows a magnetic substrate.
Figure 1B:
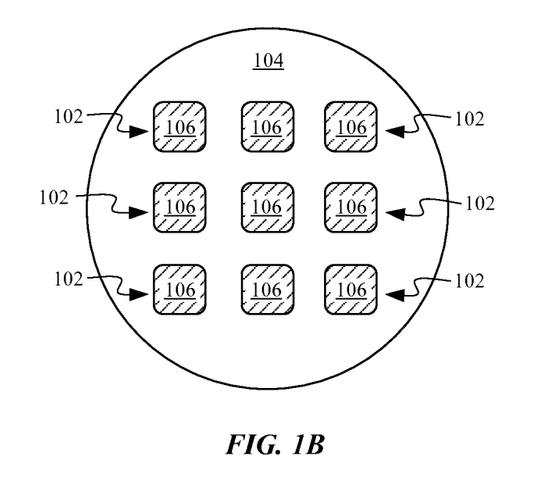
FIG. 1B shows how slices of the magnetic substrate depicted in FIG. 1A can be arranged upon a layer of grinding tape.
Figure 1C:
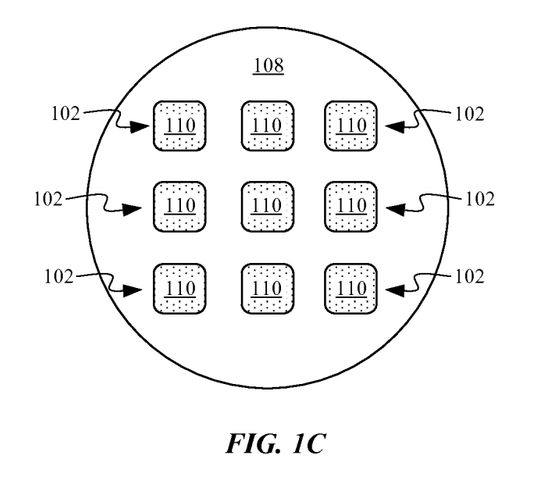
FIG. 1C shows how the slices can be flipped over after applying a grinding operation to a first surface of each of the slices.

FIGS. 1A-1E illustrate a number of steps for forming thin magnetic substrates. The magnetic material for the magnetic substrates can be initially formed as part of a sintering operation in which magnetic material is formed into a shape suitable for further processing. It should be understood that the described processes can be applied to any magnetizable substrate but sintered magnetizable substrates will be used. In a first step illustrated by FIG. 1A, sintered magnetizable material 100 is cut into a number of slices 102 having a thickness greater than a desired thickness of a finished magnet. FIG. 1B shows how slices 102 can be arranged upon and laminated to grinding tape 104 for further processing. In some embodiments, lamination of slices 102 to grinding tape 104 can be accomplished by a layer of UV curable adhesive arranged upon grinding tape 104. The UV curable adhesive can be utilized so that magnetic substrate surface damage and contamination caused by infiltration of grinding fluid and/or debris can be prevented. In some embodiments, UV irradiation of the UV-curable adhesive can substantially reduce a strength of the adhesive bond between slices 102 and grinding tape 104 so that an amount of stress transferred to slices 102 can be minimized. While the slices are arranged upon grinding tape 104, a grinding operation can be applied to upward facing surfaces 106 of slices 102 until a desired finish is achieved upon each of surfaces 106. This initial grinding operation provides an opportunity to make each of slices 102 substantially the same thickness. After completing the initial grinding operation, slices 102 can be flipped over and adhered to another sheet of grinding tape 108 so that after grinding tape 104 is removed from surfaces 110 of slices 102, surfaces 110 of slices 102 can be exposed, as depicted in FIG. 1C. After surfaces 110 are exposed, a grinding operation can be applied to surfaces 110 until a desired surface finish and thickness of slices 102 are achieved. In some embodiments, the desired thickness can be on the order of between 80-200 microns. Subsequent to thinning the slices to the desired thickness, dicing operations can be applied to slices 102 by a linear cutting tool such as for example a diamond saw.

Figure 1D:
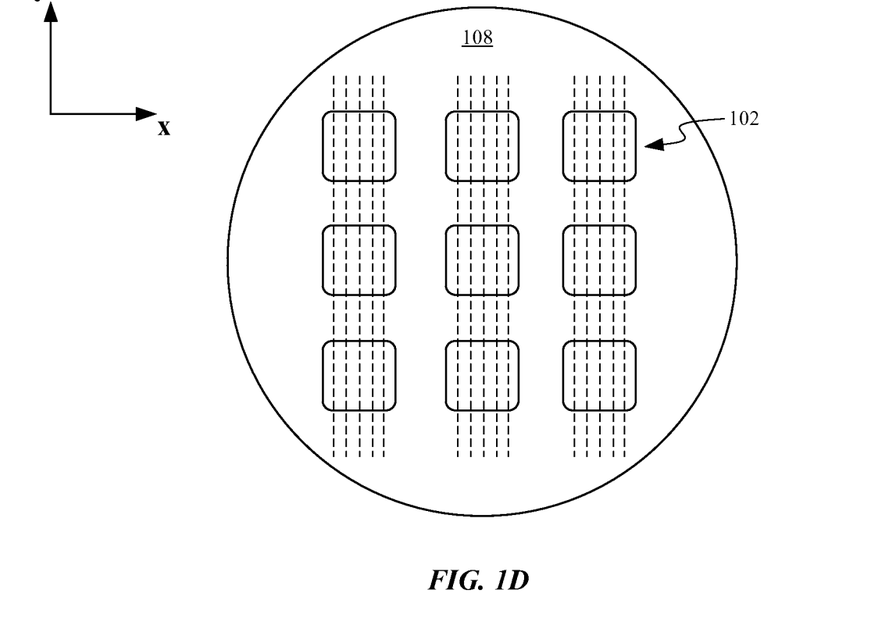
FIG. 1D shows how a dicing operation can be applied in a first direction.
Figure 1E:
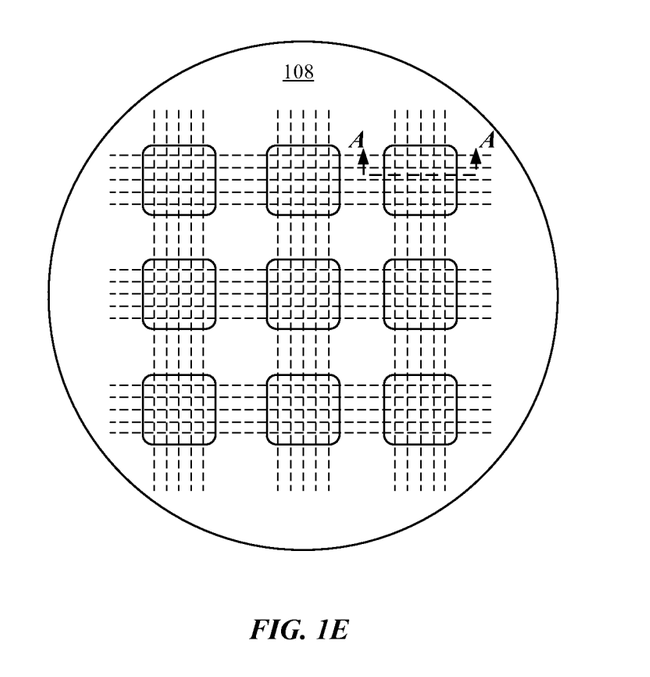
FIG. 1E shows how a subsequent dicing operation can be applied in a second direction offset from the first direction depicted in FIG. 1D.

FIG. 1D shows how a first set of cutting operations can be performed along the x-axis and then FIG. 1E shows how a second set of cutting operations can be performed along the y-axis. While the figures show each of the slices being diced into a rather limited number of magnetic substrates, it should be understood that the slices can be diced into any number of discrete magnetic substrates. Furthermore, a shape of the diced magnetic substrates can also vary widely. For example, triangular or other polygonal shapes can be achieved with the aforementioned linear cutting tool. In some embodiments, subsequent finishing operations can be applied to the resulting magnets before removing the diced magnets from grinding tape 108. In some embodiments, an automated arm along the lines of a pick and place can be used to remove the magnets from the grinding tape and transfer them to another supporting/fixturing device for holding the magnets in place during various magnetizing and finishing operations.

Figure 2A:
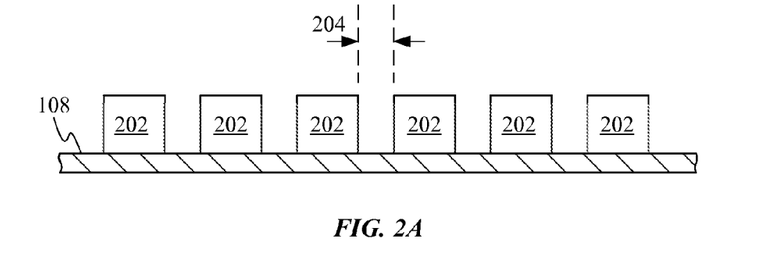
FIG. 2A shows a cross-sectional view of magnets affixed to a layer of grinding tape after having undergone a number of dicing operations.
Figure 2B:
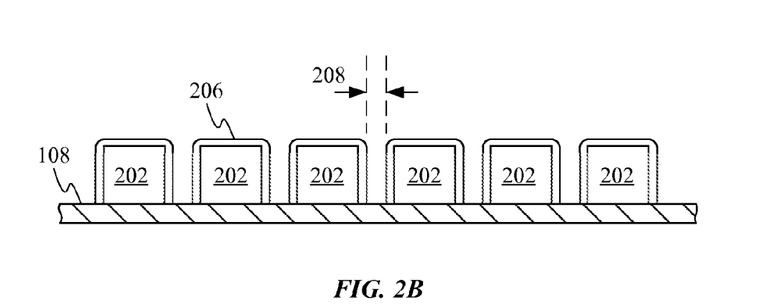
FIG. 2B shows a cross-sectional view of the magnets depicted in FIG. 2A in which an anti-corrosive layer has been applied to the magnetic elements.
Figure 2C:
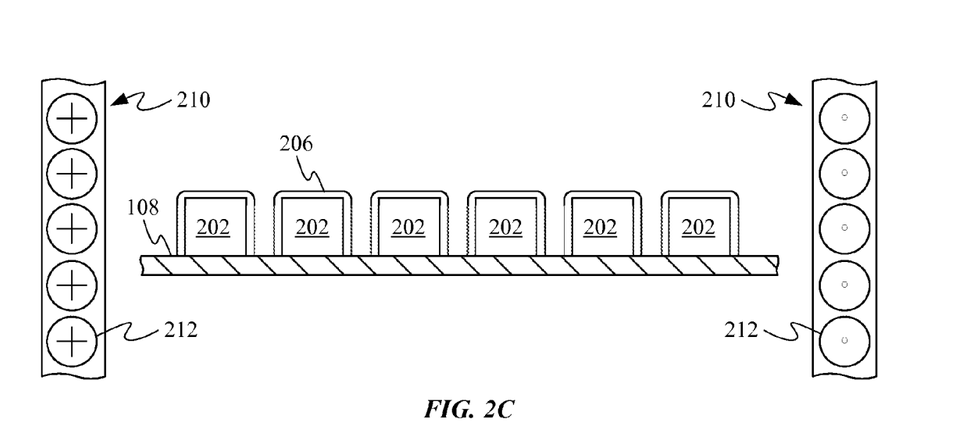
FIG. 2C shows the magnetic elements depicted in FIG. 2B undergoing a magnetizing operation.

FIGS. 2A-2C show how in some embodiments anti-corrosion coating and magnetizing operations can be applied to magnetic elements 202 prior to removing magnetic elements 202 from grinding tape 108. FIG. 2A shows a cross-sectional view in accordance with section line A-A of FIG. 1E. The cross-sectional view of magnetic elements 202 are shown being adhered to grinding tape 108. Each of magnetic elements 202 are separated from adjacent magnetic elements 202 by an interval 204. Interval 204 can be created by the material removed from slices 102 during the dicing operations. In some embodiments, interval 204 can correspond to a thickness of the linear tool used to cut dice. FIG. 2B shows how an anti-corrosion coating 206 can be added to cover exposed surfaces of magnetic elements 202. Addition of anti-corrosion coating 206 can narrow an interval between magnetic elements 202 from interval 204 to interval 208; however, a thickness of anti-corrosion coating can be particularly thin along the lines of about 30 microns. In some embodiments, anti-corrosion coating 206 can be formed of a nickel alloy. In other embodiments, other magnetically attractable coatings with suitable corrosion resistance can be utilized.

FIG. 2C shows magnetic elements 202 arranged within a magnetizing coil 210 for carrying out a magnetizing operation. Magnetizing coil 210 includes a number of coils 212 that carry electricity that is used to generate a magnetizing field within magnetizing coil 210. In some embodiments, an adhesive bond between grinding tape 108 and magnetic elements 202 can prevent magnetic elements 202 from shifting out of position subsequent to the magnetizing operation depicted in FIG. 2C. In some embodiments, an adhesive bond between grinding tape 108 and magnetic elements 202 can be sufficient to withstand stresses induced by magnetic field interaction between magnetic elements 202 for a period of time. In some embodiments, grinding tape 108 can be supported within magnetizing coil 210 by a non-magnetic frame (not depicted) that doesn't interfere with the magnetizing operations. While a basic magnetizing coil is depicted it should be understood that more complex magnetizing coils can be utilized during a magnetizing operation. More complex fields may require separation of magnetic elements 202 from grinding tape 108.

Figure 2D:
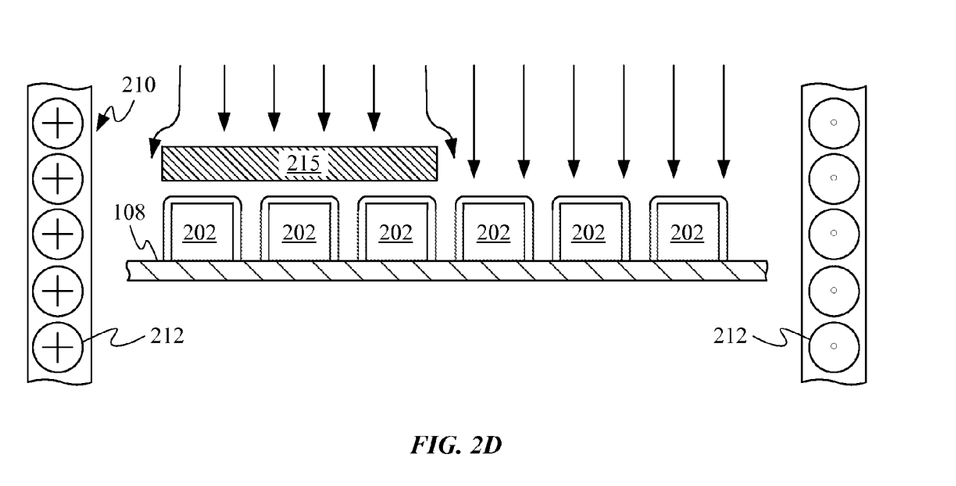
FIGS. 2D-2E show how a shielding element or mask can be utilized to produce an array of magnetic elements fixed to an adhesive sheet in which some of the magnets have different polarities.
Figure 2E:
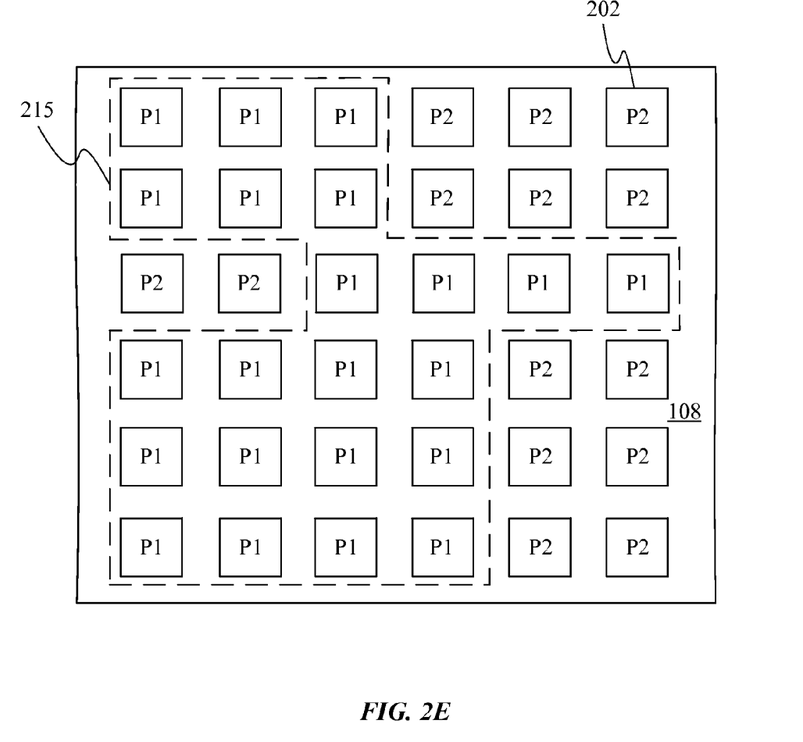

FIG. 2D shows an alternative magnetization configuration. In particular, shielding element 215 can be added above and/or below magnetic elements 202 to prevent magnetization of the magnets overlaid by shielding elements 215. Shielding element 215 can be formed of materials that redirect magnetic fields around shielding elements 215, as depicted. Preventing magnetization of certain magnets, allows a subsequent magnetizing operation to be carried out in which the magnetized magnets are covered and the unmagnetized magnets are exposed to a magnetizing field having different characteristics. In some embodiments, the emitted fields can be in the same direction but varied so that some magnets attached to the grinding tape are stronger than others. In some embodiments, the emitted fields can be oriented in different directions. FIG. 2E shows a top view of a two dimensional array of magnets, suitable for being magnetized within magnetizing coil 210, in which some of the adjacent magnets have a first polarity (P1) and others have a second polarity (P2). In some embodiments, shielding element 215 can take the form of a mask that shields certain magnets of the two dimensional magnet array from being exposed to a magnetizing field emitted by magnetizing coil 210. A shape of the mask when applying the magnetizing field for the P2 polarities can correspond to the dashed lines depicted in FIG. 2E. In some embodiments, the mask can be formed of numerous shielding elements 215. In some embodiment, by applying different magnetic fields to different magnets in the two dimensional array, at least some of the magnets from the array can be transferred together to a device designed to operate with the pattern of emitted magnetic fields established by the sequential magnetizing operations.

Figure 2F:
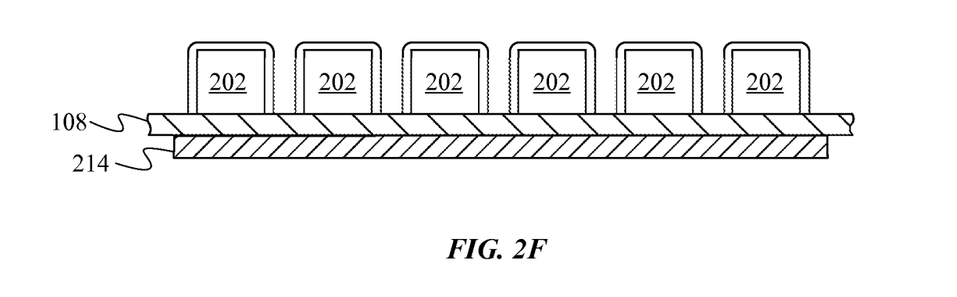
FIG. 2F shows how a magnetically attractable plate can be placed beneath a number of magnetic elements to prevent motion of a number of magnetized magnetic elements.

FIG. 2F shows a step in which a magnetically attractable plate is added beneath grinding tape 108 to prevent shearing of the adhesive bonds between grinding tape 108 and magnetic elements 202. The shearing forces can be generated when magnetic field emitted by adjacent magnetic elements 202 interact with and attract each other. The magnetic attraction between magnetically attractable plate 214 and magnetic elements 202 can cooperate with the adhesive bond coupling grinding tape 108 to magnetic elements 202 so that magnetic elements 202 are kept firmly in place for any follow on manufacturing processes. For example, precise placement of magnetic elements 202 on grinding tape 108 can be helpful when computer controlled machinery is utilized to manipulate and assembly magnetic elements 202 into various electronic devices. In some embodiments, magnetically attractable plate 214 can be adhesively coupled to a surface of grinding tape 108. In some embodiments, various clamping mechanisms or other securing means can be used to keep magnetically attractable plate 214 in contact with grinding tape 108. Magnetic forces between magnetic elements 202 and magnetically attractable plate 214 can also assist in maintaining a coupling with magnetically attractable plate 214 during subsequent manufacturing and/or assembly operations.

Figure 2G:
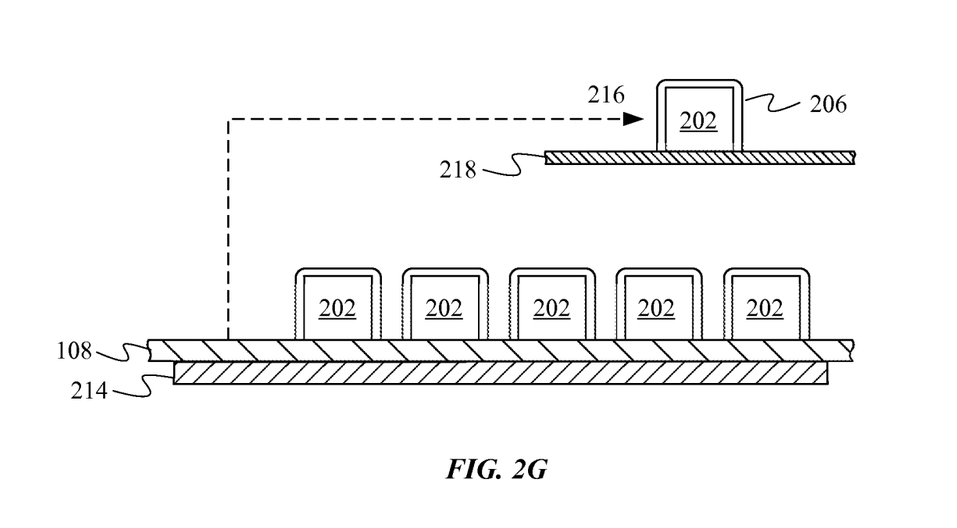
FIG. 2G shows how one of the magnets can be installed upon another electrical component.

In FIG. 2G, one of magnetic elements 202 is depicted after having been separated from grinding tape 108. Arrow 216 shows a possible path taken while moving magnetic element 202 from grinding tape 108 to substrate 218. In some embodiments, a pick and place can be used to remove magnetic element 202 from grinding tape 108 and install magnetic element 202 on substrate 218. In some embodiments, substrate 218 can take the form of a printed circuit board (PCB). While removing magnetic element 202 from grinding tape 108, the pick and place can be configured to exert an amount of force on magnetic element 202 sufficient to sever an adhesive bond between magnetic element 202 and grinding tape 108 while also overcoming a force generated by magnetic interaction between magnetic element 202 and magnetically attractable plate 214. It should be noted that magnetically attractable plate 214 can take the form of a sheet of steel or any other ferrous material.

In some embodiments, the attachment of magnetic elements 202 to substrate 218 should be conducted quickly to avoid undue exposure of an exposed surface of magnetic element 202 to corrosive molecules in the air. In some embodiments, the pick and place step can be performed under near vacuum conditions to prevent exposure of the exposed surface of magnetic element 202 to the aforementioned corrosive molecules. Once mounted to substrate 218, anti-corrosive coating 206 in cooperation with substrate 218 can prevent magnetic element 202 from being exposed to any potentially corrosive gases. In some embodiments, substrate 218 can take the form of a printed circuit board (PCB). Such a configuration can allow the PCB to act as both a carrier for magnetic element 202 and to support other electrical components such as processors and other discrete electrical components. In some embodiments, a shunt or shielding device can be arranged around magnetic element 202 to help shield other electrical components mounted to the PCB. The shunt can also be utilized to concentrate a magnetic field emitted by magnetic element 202 towards a location in which a magnetic field emitted by the magnet is designed to act. In some embodiments, the magnet positioned upon the PCB can be integrated into a voice coil motor (VCM). In certain cases the reduced thickness achieved by the aforementioned machining operations can produce a VCM with particularly small dimensions that can reduce an overall size of a camera module utilizing the VCM. For example, the VCM can be utilized to drive an autofocus component of the camera module without significantly adding to an overall size of the camera module.

Figure 3A:
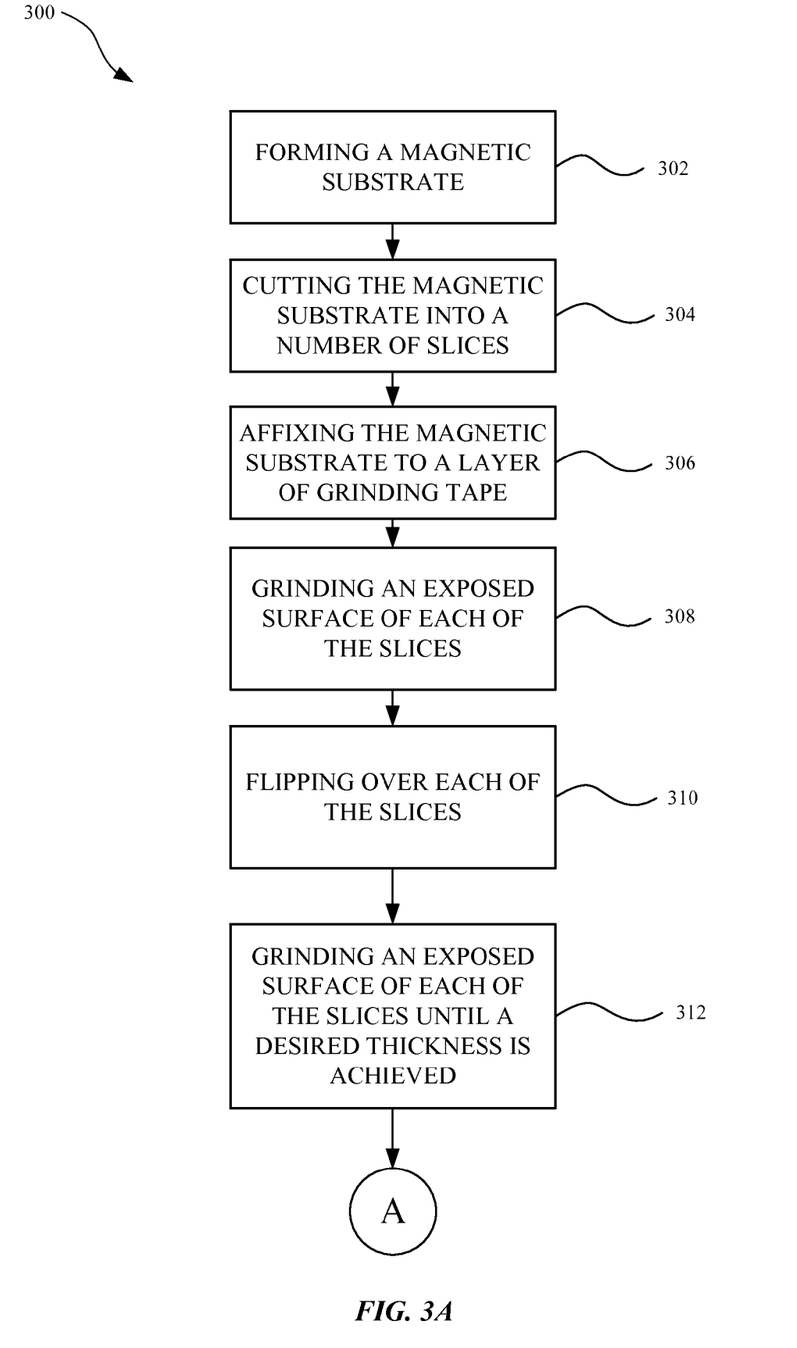
FIGS. 3A-3B show flow diagrams depicting a method for forming a number of thin magnetic elements with high dimensional accuracy.
Figure 3B:
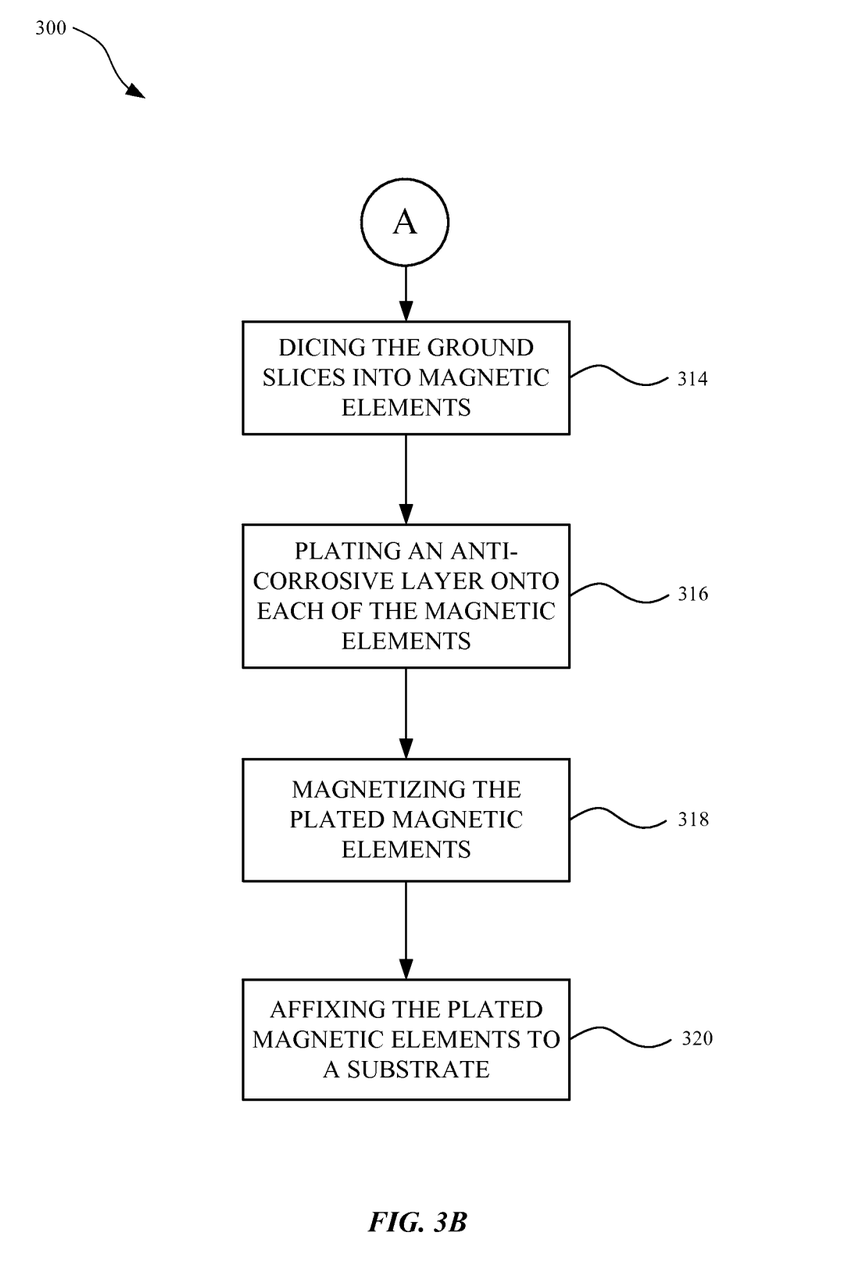

FIGS. 3A-3B show a block diagram representing a method for forming thin magnets. FIG. 3A includes a first step 302, where a sintered magnetic substrate is formed. In some embodiments, the magnetic substrate can be a composite magnetic substrate along the lines of a Neodymium or Samarium-Cobalt magnets. The sintering process involves melting down the various raw materials necessary to form the magnetic metal alloys. The melting process can be performed in an induction melting furnace. After liquefying the various metals, the molten metals can be poured into thin metal strips that can then be crushed and/or pulverized to form a fine powder. The fine powder is then compressed or compacted together. An aligning magnetic field is generally applied during the compression to align the crystalline structure of the magnetic structure in a desired direction. The compression can be applied to an amount of material that forms a magnetic substrate having a slightly larger size than that desired. Subsequent to the compression and particle alignment step the compressed powder is loaded into a container and heated to a sintering temperature within for example a vacuum sintering furnace. The heating portion of the sintering process tends to shrink the compressed powder down by at least 10-15%. Magnetic substrates formed in this manner tend to exhibit no external magnetic field subsequent to being cooled after reaching the sintering temperature. At step 304, the sintered magnetic substrate is cut into a number of slices having about the same size and thickness. In some embodiments, a manner in which the slices are cut can influence a magnetic direction of resulting magnets produced by this process. Unfortunately, the above described sintering process tends to produce a magnetic substrate with substantial variations in shape and surface properties/roughness.

At step 306, slices of the magnetic substrate are affixed to a layer of grinding tape. In some embodiments, the magnetic substrate can be adhesively fixed to the layer of grinding tape with UV curable adhesive. At step 308, an exposed layer of each slice undergoes a grinding operation in which a desired finish is produced and in some embodiments, a uniform thickness of each of the slices is achieved. In some embodiments, the desired finish can increase a surface energy of the surface to enhance adhesion between the surface of the slice and another object. At step 310, the ground surfaces of the magnetic substrates are adhesively affixed to another layer of grinding tape. After affixing the magnetic substrates to the other layer of grinding tape, the first layer of grinding tape can be removed to reveal an opposite side of each of the magnetic substrates. In some embodiments, when the slices are affixed to the other layer of grinding tape with the UV curable adhesive, the UV curable adhesive can be irradiated to reduce adhesive coupling between the slices and the other layer of grinding tape. At step 312, each of the magnetic substrates can undergo another grinding operation until the slices are thinned to a desired thickness.

The steps in the method continue in FIG. 3B at step 314 in which each of the ground magnetic slices undergo a series of dicing operations to produce a number of magnets from each magnetic substrate. The dicing operations can be performed as part of a computer controlled machining operation, giving the dicing blades or saws greater degrees of accuracy and precision. In some embodiments, the dimensional accuracy of the cuts made by the dicing blade or saw can be accurate to within +/−10 microns. At step 316, an anti-corrosive layer is plated onto each of the magnets. In some embodiments, the anti-corrosive layer can coat or cover only five sides of each of the magnets. This configuration can result when the magnets remain affixed to a layer of grinding tape. By leaving a side of the magnet uncoated an overall thickness of the magnet can be reduced. This can be especially beneficial when the uncoated surface is designed to be permanently adhered to another surface, when that surface can provide sufficient anti-corrosive properties to the magnet. In embodiments where the anti-corrosive layer is desired on all surfaces the magnets can be separated from the grinding tape prior to a plating or coating operation. The plating operation can be performed by electrolysis or other deposition processes. The anti-corrosive layer can be formed from any one of a number of materials. Some examples of appropriate materials for use as anti-corrosive coatings can include Nickel, copper, zinc, gold, silver, tin, titanium, and chrome to name a few. Subsequent to adding the anti-corrosive plating the magnets can undergo magnetizing operations at step 318. In some embodiments, magnetizing coils can be configured to apply a magnetic field that aligns with a grain or crystal structure of the magnetic substrates. In this way, an amount of magnetic energy applied to the magnet can be optimized. Finally, at step 320, each of the magnets can be attached to a product for end use. In some embodiments, the magnets can form part of an electromagnetic system such as a voice coil motor. In other embodiments, the magnets can be employed for use as part of an attachment system.

Figure 4:
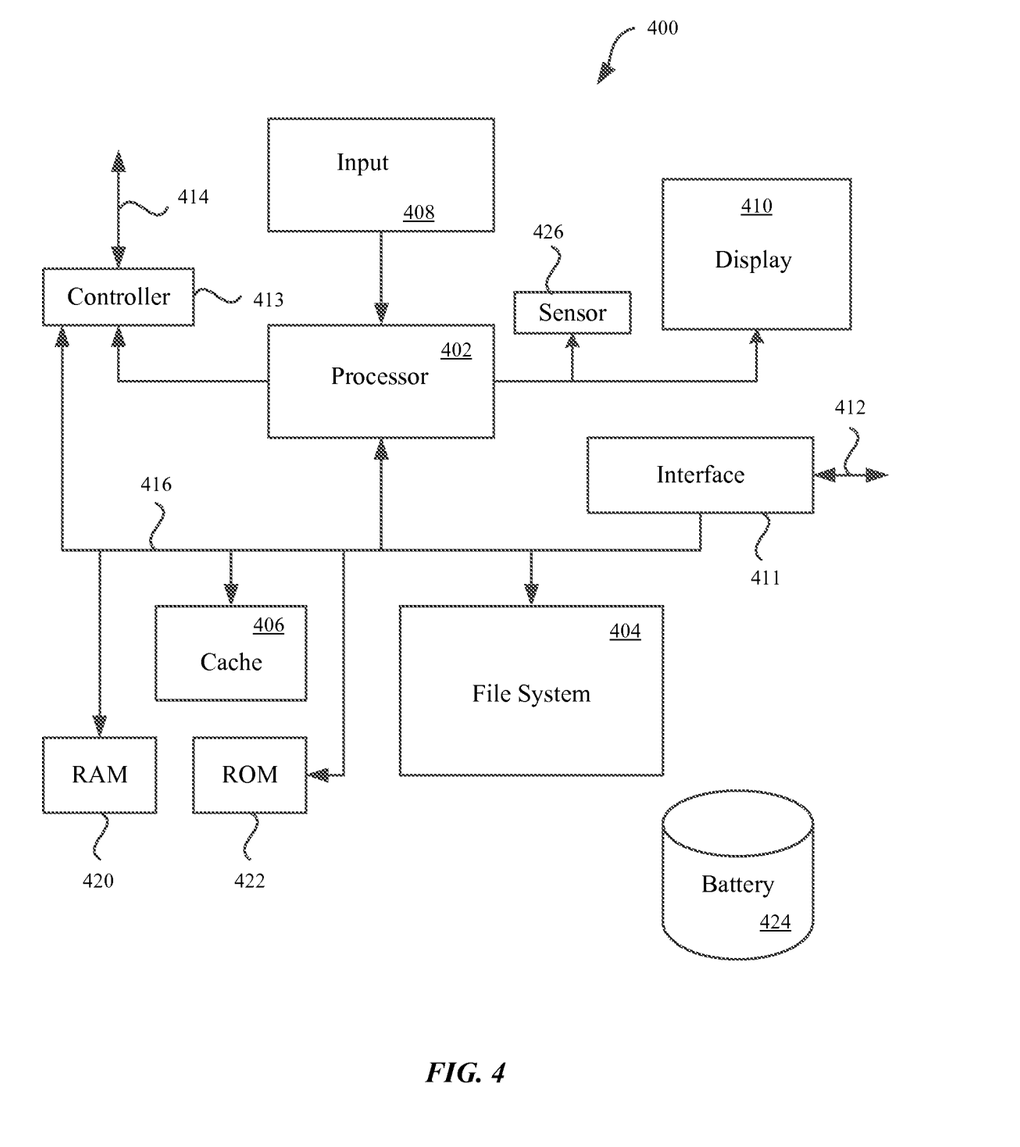
FIG. 4 depicts a computing device suitable for carrying out some of the manufacturing processes described herein.

FIG. 4 is a block diagram of an electronic device suitable for controlling some of the processes in the described embodiment. Electronic device 400 can illustrate circuitry of a representative computing device. Electronic device 400 can include a processor 402 that pertains to a microprocessor or controller for controlling the overall operation of electronic device 400. Electronic device 400 can include instruction data pertaining to operating instructions in a file system 404 and a cache 406. File system 404 can be a storage disk or a plurality of disks. In some embodiments, file system 404 can be flash memory, semiconductor (solid state) memory or the like. The file system 404 can typically provide high capacity storage capability for the electronic device 400. However, since the access time to the file system 404 can be relatively slow, the electronic device 400 can also include cache 406. The cache 406 can include, for example, Random-Access Memory (RAM) provided by semiconductor memory. The relative access time to the cache 406 can substantially shorter than for the file system 404. However, cache 406 may not have the large storage capacity of file system 404. Further, file system 404, when active, can consume more power than cache 406. Power consumption often can be a concern when the electronic device 400 is a portable device that is powered by battery 424. The electronic device 400 can also include a RAM 420 and a Read-Only Memory (ROM) 422. The ROM 422 can store programs, utilities or processes to be executed in a non-volatile manner. The RAM 420 can provide volatile data storage, such as for cache 406.

Electronic device 400 can also include user input device 408 that allows a user of the electronic device 400 to interact with the electronic device 400. For example, user input device 408 can take a variety of forms, such as a button, keypad, dial, touch screen, audio input interface, visual/image capture input interface, input in the form of sensor data, etc. Still further, electronic device 400 can include a display 410 (screen display) that can be controlled by processor 402 to display information to the user. Data bus 416 can facilitate data transfer between at least file system 404, cache 406, processor 402, and controller 413. Controller 413 can be used to interface with and control different manufacturing equipment through equipment control bus 414. For example, control bus 414 can be used to control a computer numerical control (CNC) mill, a press, or other manufacturing devices. For example, processor 402, upon a certain manufacturing event occurring, can supply instructions to control another manufacturing device through controller 413 and control bus 414. Such instructions can be stored in file system 404, RAM 420, ROM 422 or cache 406.

Electronic device 400 can also include a network/bus interface 411 that couples to data link 412. Data link 412 can allow electronic device 400 to couple to a host computer or to accessory devices. The data link 412 can be provided over a wired connection or a wireless connection. In the case of a wireless connection, network/bus interface 411 can include a wireless transceiver. Sensor 426 can take the form of circuitry for detecting any number of stimuli. For example, sensor 426 can include any number of sensors for monitoring such as, for example, a Hall Effect sensor responsive to external magnetic field, an audio sensor, a light sensor such as a photometer and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of manufacturing an ultra-thin magnet for use in a small form factor electronic component, the method comprising:
   cutting a substrate formed of magnetizable material into slices;
   thinning the slices to form thinned slices by:
      mounting the slices to a first support structure;
      removing a first amount of material from exposed first surfaces of the slices,
      flipping the slices over and mounting the slices to a second support structure, and
      removing a second amount of material from exposed second surfaces of the slices;
   singulating the thinned slices into individual magnetic elements; and
   magnetizing the individual magnetic elements in accordance with a desired magnetic property.

2. The method as recited in claim 1, wherein, while singulating the thinned slices, the individual magnetic elements are adhesively coupled to the second support structure.

3. The method as recited in claim 1, wherein, subsequent to removing the second amount of material, an overall thickness of each of the thinned slices is within a range of +1/−5 microns of a nominal thickness of each other.

4. The method as recited in claim 1, further comprising:
   magnetically coupling a ferrous substrate with each of the individual magnetic elements by placing the ferrous substrate in direct contact with a surface of the second support structure that is opposite to a surface of the second support structure that is in contact with the individual magnetic elements.

5. The method as recited in claim 1, wherein the first and second support structures include a layer of UV-curable adhesive for affixing the thinned slices, and wherein UV irradiation of the UV-curable adhesive generally reduces a strength of an adhesive bond between the thinned slices and the first and second support structures.

6. The method as recited in claim 1, wherein removing the first and second amounts of material includes applying grinding operations to the exposed first and second surfaces of each of the slices until the slices have a generally similar thickness.

7. The method as recited in claim 1, wherein singulating the thinned slices includes applying a number of sawing operations in a first direction and a number of sawing operations in a second direction orthogonal to the first direction.

8. The method as recited in claim 1, wherein each of the individual magnetic elements has a thickness that is less than 100 microns.

9. The method as recited in claim 1, further comprising:
   plating the individual magnetic elements with an anti-corrosive layer.

10. A method for forming an ultra-thin magnet for use in an electronic component for a portable electronic device, comprising:
    cutting a magnetizable substrate into slices;
    removing a first amount of material from a first side of each of the slices while the slices are secured to a first adhesive support structure;
    flipping the slices over and securing the slices to a second adhesive support structure;
    removing a second amount of material from a second side of each of the slices that is opposite to the first side while the slices are secured to the second adhesive support structure until a desired thickness of each of the slices is achieved;
    of singulating the slices into magnetic elements; and
    magnetizing the magnetic elements.

11. The method as recited in claim 10, wherein, subsequent to magnetizing the magnetic elements, the method further comprises:
    detaching the magnetic elements from the second adhesive support structures; and installing the magnetic elements on a printed circuit board (PCB) so that an exposed surface of each of the magnetic elements is coupled with a surface of the PCB.

12. The method as recited in claim 10, wherein singulating the slices includes using a linear cutting tool to cut the slices into the magnetic elements.

13. The method as recited in claim 10, wherein, subsequent to magnetizing the magnetic elements, the method further comprises:
coupling a magnetically attractable plate to the second adhesive support structure, thereby fixing the magnetic elements in place on the second adhesive support structure.

14. The method as recited in claim 10, wherein the first adhesive support structure is a first adhesive sheet, and the second adhesive support structure is a second adhesive sheet.

15. The method as recited in claim 14, further comprising:
irradiating the second adhesive sheet to reduce adhesive coupling between the first side of each of the slices and the second adhesive sheet; and
subsequently, separating each of the slices from the second adhesive sheet.

16. The method as recited in claim 10, further comprising:
plating the first and second sides of the magnetic elements with an anti-corrosive layer.

* * * * *